United States Patent [19]

Humpert et al.

[11] Patent Number: 5,148,551
[45] Date of Patent: Sep. 22, 1992

[54] SURFACE-MOUNTING MIXING VALVE

[75] Inventors: Jürgen Humpert, Hemer; Manfred Pawelzik, Soest, both of Fed. Rep. of Germany

[73] Assignee: Friedrich Grohe Armaturenfabrik GmbH + Co., Hemer, Fed. Rep. of Germany

[21] Appl. No.: 491,666

[22] Filed: Mar. 9, 1990

[30] Foreign Application Priority Data

Mar. 10, 1989 [DE] Fed. Rep. of Germany ....... 3907893

[51] Int. Cl.⁵ .............................................. E03C 1/04
[52] U.S. Cl. .................................. 4/192; 137/625.17
[58] Field of Search ................... 4/192, 567, 570, 601, 4/628, 654; 137/359, 625.17, 625.4

[56] References Cited

U.S. PATENT DOCUMENTS

| 1,572,412 | 2/1926 | Vallier | 4/192 X |
|---|---|---|---|
| 2,143,005 | 1/1939 | Green | 403/362 X |
| 3,770,017 | 11/1973 | Enterante | 137/625.17 |
| 3,807,453 | 4/1974 | Dom et al. | 137/625.17 |
| 3,943,961 | 3/1976 | Knapp | 137/625.17 X |
| 3,943,970 | 3/1976 | Knapp | 137/625.17 X |
| 3,955,598 | 5/1976 | Knapp | 137/625.17 X |
| 4,325,403 | 4/1982 | Uhlmann | 137/625.17 X |
| 4,393,523 | 7/1983 | Nolden | 4/192 |
| 4,446,885 | 5/1984 | Nolden | 4/192 X |
| 4,606,370 | 8/1986 | Geipel et al. | 137/359 |
| 4,856,556 | 8/1989 | Mennigmann | 137/625.4 |

FOREIGN PATENT DOCUMENTS

| 0123172 | 10/1984 | European Pat. Off. . | |
| 0204667 | 12/1986 | European Pat. Off. . | |
| 2102402 | 7/1971 | Fed. Rep. of Germany . | |
| 2219893 | 12/1972 | Fed. Rep. of Germany | 4/192 |
| 1106290 | 3/1968 | United Kingdom . | |

OTHER PUBLICATIONS

1732891. Friedrich Grohe Armaturenfabrik Hemer (Westf.)-Handstuck mit Handstuckfunktionsteilen fur Schlauchbrause, Feb. 20, 1956, G 13084 5 pages.

*Primary Examiner*—Henry J. Recla
*Assistant Examiner*—Robert M. Fetsuga
*Attorney, Agent, or Firm*—Herbert Dubno; Andrew Wilford

[57] ABSTRACT

A valve assembly adapted for connection to separate hot- and cold-water supply pipes has a core centered on an axis and formed with a pair of input passages having output ends and diametrally oppositely opening input ends and with an output passage having an output end and an input end and respective substantially identical input fittings formed with respective fitting passages and fitted diametrally oppositely to the core with the fitting passages opening into the input ends of the input passages. Respective connections carried on the input fittings communicate with the respective fitting passages. These connections are connected to the respective hot- and cold-water supply pipes. At least one valve is fixed in the core covering the output ends of the input passages and the input end of the output passage for feeding hot and cold water from the respective input passages to the output passage. An output fitting is fixed to the core over the output end of the output passage. The core is substantially cylindrical and the input ends of the input passages are threaded. The fittings have inner ends threaded into the input ends of the input passages and are provided with respective seal rings engaging the core. The core is provided with set screws or the like for locking the fittings against rotation in the input ends. To this end the inner ends of the fittings are formed with flats engaged by the respective screws.

8 Claims, 4 Drawing Sheets

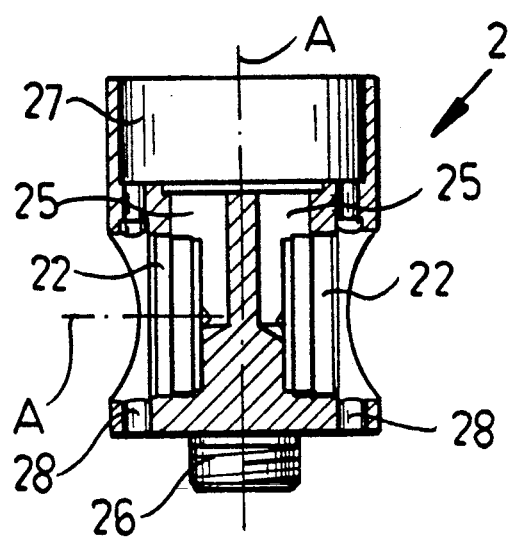
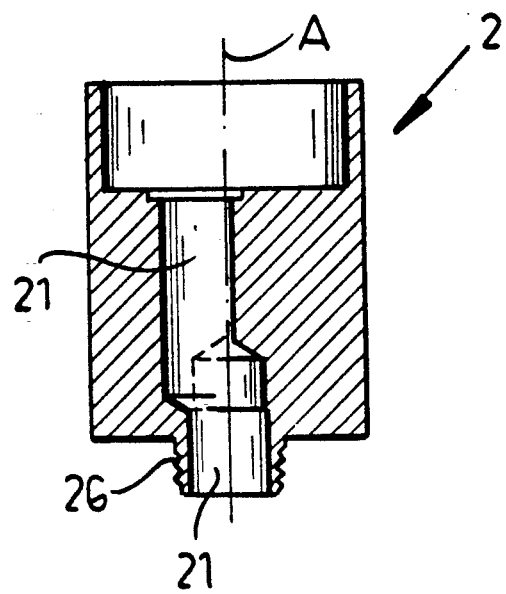
FIG.3  FIG.4
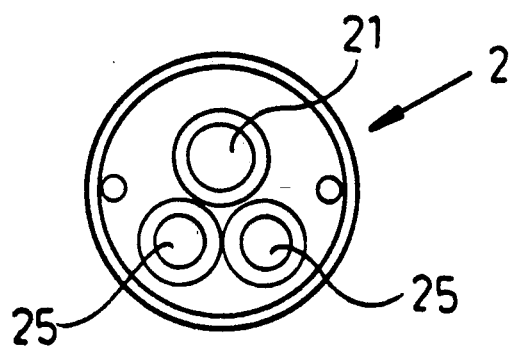
FIG.5

SURFACE-MOUNTING MIXING VALVE

FIELD OF THE INVENTION

The present invention relates to a surface-mount mixing valve. More particularly this invention concerns a sink or bath faucet and/or hand shower.

BACKGROUND OF THE INVENTION

A standard surface-mount mixing faucet adapted to be connected to hot- and cold-water supply pipes that project from the mounting surface has a massive metallic body provided with couplings for the supply pipes and also fitted with the necessary valve, faucet, and diverter structure. It is known from German patent document 2,102,402 (filed by V. Riis based on a Swedish priority date of Jan. 21, 1970) to make the body of the valve such that it can be used in different setups. The body remains, however, a massive cast structure that can only be produced at considerable cost and that at best is only limitedly adaptable to different applications, for instance use with or without a shower.

OBJECTS OF THE INVENTION

It is therefore an object of the present invention to provide an improved surface-mount mixing valve.

Another object is the provision of such an improved surface-mount mixing valve which overcomes the above-given disadvantages, that is which is of inexpensive but highly adaptable construction.

SUMMARY OF THE INVENTION

A valve assembly adapted for connection to separate hot- and cold-water supply pipes according to this invention has a core centered on an axis and formed with a pair of input passages having output ends and diametrally oppositely opening input ends and with an output passage having an output end and an input end and respective substantially identical input fittings formed with respective fitting passages and fitted diametrally oppositely to the core with the fitting passages opening into the input ends of the input passages. Respective connections carried on the input fittings communicate with the respective fitting passages. These connections are connected to the respective hot- and cold-water supply pipes. At least one valve is fixed in the core covering the output ends of the input passages and the input end of the output passage for feeding hot and cold water from the respective input passages to the output passage. An output fitting is fixed to the core over the output end of the output passage. According to this invention the core is substantially cylindrical and the input ends of the input passages are threaded. The fittings have inner ends threaded into the input ends of the input passages and are provided with respective seal rings engaging the core. The core is provided with set screws or the like for locking the fittings against rotation in the input ends. To this end the inner ends of the fittings are formed with flats engaged by the respective screws.

Thus with the system of this invention all of the parts can be machined and nothing needs to be expensively cast. This greatly reduces the cost of the assembly while still producing a very high-quality product.

According to another feature of the invention the valve is a single-control valve and the core is formed with a flat seat on which the valve rests and at which the output ends of the input passages and the input ends of the output passage open. It is also within the scope of this invention to provide individual valves for hot and cold flow control, each valve being mounted opposite the other on a respective side of the core. Thus the core is formed with a mixing chamber and the valves are in effect installed between the ends of the input passages in the core.

In accordance with further features of this invention the fittings are elongated and centered on a common transverse axis and the fitting passages are L-shaped with their output ends opening axially of the transverse axis and their input ends opening at the respective connections transversely of the transverse axis. These fittings have outer ends projecting past the respective connections. Furthermore a decorative cap can be snap fitted on at least one of the outer ends which to this end is formed with a peripheral outwardly open groove into which the cap fits. A holder for a shower or sprayer can also be fixed on at least one of the outer ends and provided with a mounting screw threaded on the transverse axis through the holder into the respective fitting. In this case the one outer end is formed with at least one flat with which the holder fits complementarily.

The output fitting of this invention is a faucet secured to an underside of the core. Furthermore the faucet is provided with a hand shower and a diverter, if necessary.

DESCRIPTION OF THE DRAWING

The above and other objects, features, and advantages will become more readily apparent from the following, reference being made to the accompanying drawing in which:

FIG. 3 is an axial section through the core of the valve of FIG. 1;

FIG. 4 is an axial section 90° offset from FIG. 3 through the valve core;

FIG. 5 is a top view of the valve core;

SPECIFIC DESCRIPTION

Figure 1:
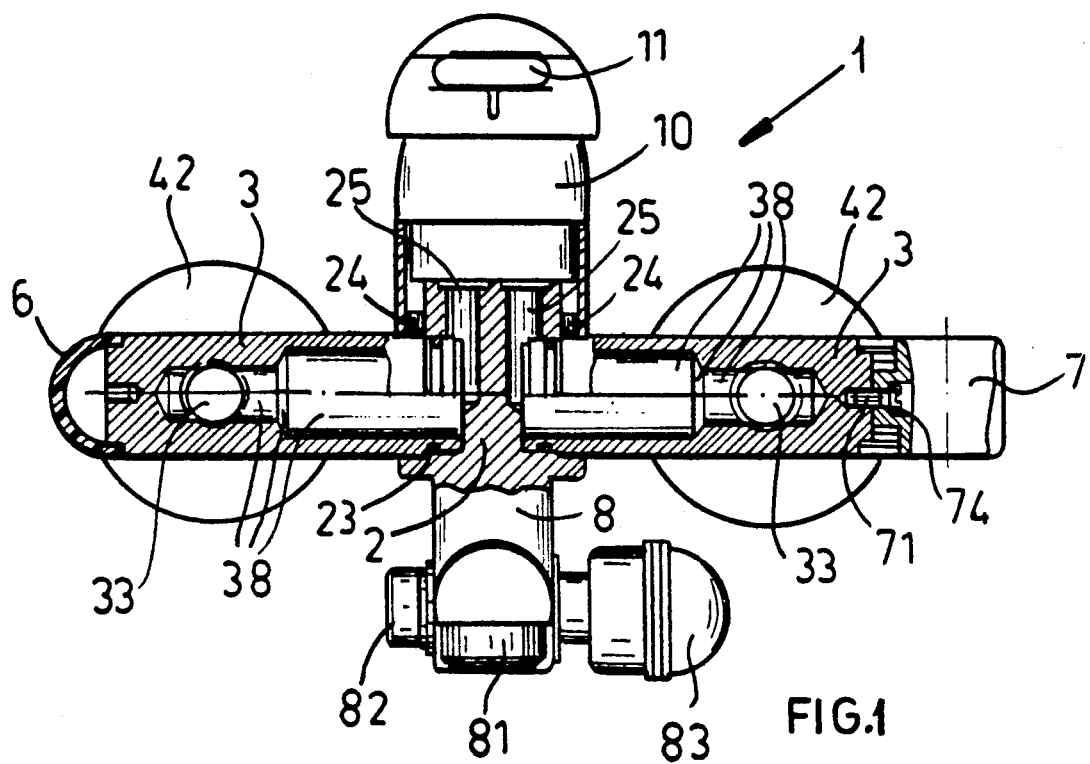
FIG. 1 is a side view partly in vertical section through the valve according to this invention
Figure 2:
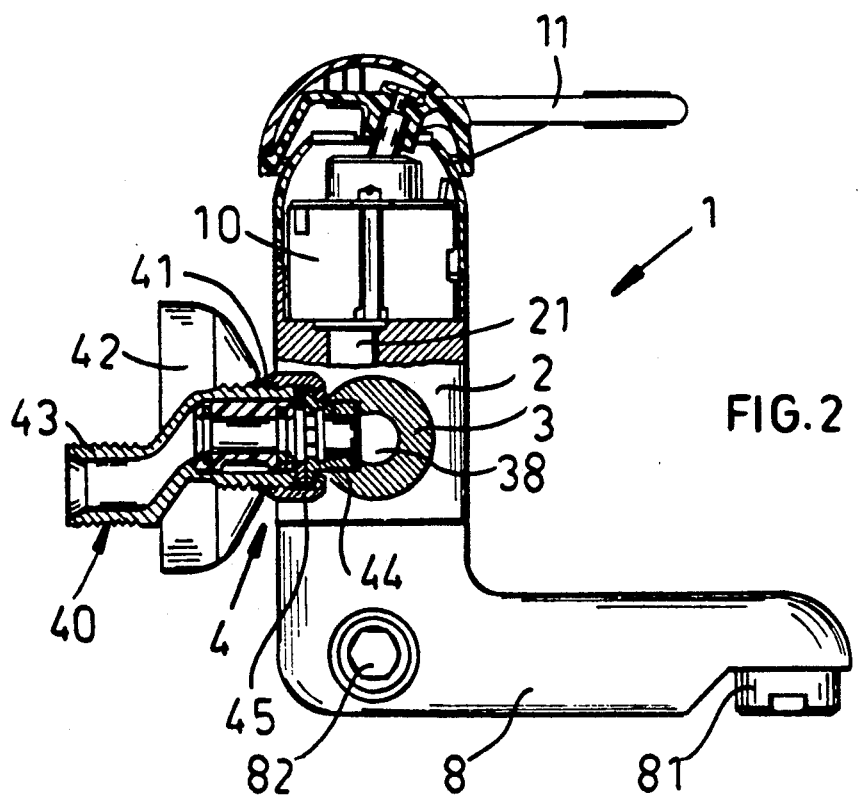
FIG. 2 is an end view partly in vertical section through the valve according to this invention.

As seen in FIGS. 1 and 2 a mixing valve 1 according to this invention basically comprises a valve core 2 from which extend two identical input fittings or tubes 3 connected to respective hot- and cold-water supplies 4. One of the fittings 3 is provided at its outer end with a decorative cover cap 6 and the other with a shower holder 7. The core part 2 carries at its top a mixing valve 10 and at its bottom a faucet 8.

Each supply 4 as seen in FIG. 2 is formed as is standard by an S-pipe 40 having a pair of parallel but offset nipples 41 and 43 that allow some adjustment for imperfect installation of the pipes in the wall. A short threaded nipple 44 is screwed tightly into the respective tube 3 and a nut 45 engages over a collar on it and with a thread on the nipple 41 to make a watertight connection. An escutcheon plate 42 covers the back nipple 43 and gives the entire assembly a neat appearance.

The core 2 as seen in FIGS. 3 through 5 is a basically cylindrical machined piece of chromium-plated brass centered on a normally upright axis A and formed with an upwardly open recess 27 receiving the valve 10 which has a single actuating lever 11. The core 2 is formed with a pair of oppositely open threaded bores 22 both centered on an axis A' perpendicular to the axis A, and with two smaller bores 25 that each open into a respective one of the bores 22 and into the recess 27 at the floor thereof. Offset somewhat from the bores 22 is yet another two-part bore 21 that extends from the floor of the recess 27 adjacent the mouths of the bores 25 to a threaded collar 26 formed centered on the axis A on the bottom end of the core 2. Small threaded holes 28 open radially into the bores 22 somewhat outward of the threaded regions thereof.

Figure 6:
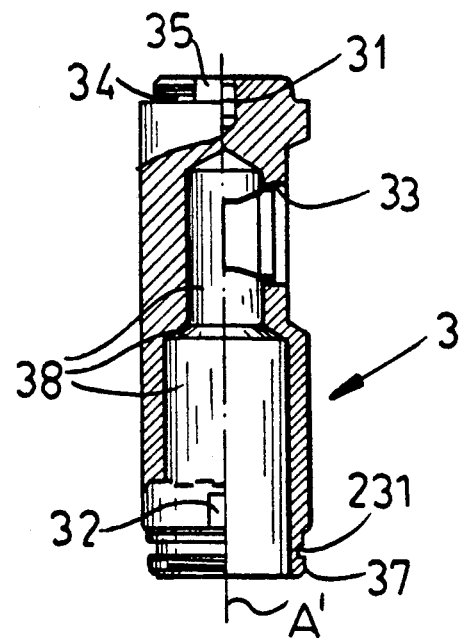
FIG. 6 is an axial section through one of the input fittings of the valve of FIG. 1.
Figure 7:
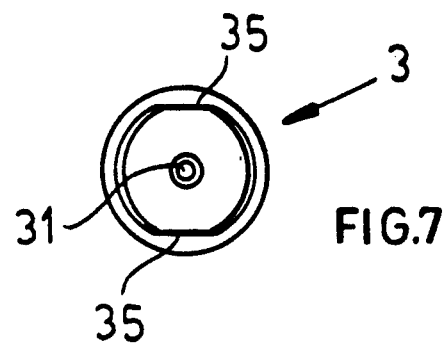
FIG. 7 is a top end view of the valve input fitting as seen in FIG. 6.

Each input fitting 3 as seen in FIGS. 6 and 7 is also formed of a massive machined piece of metal, preferably brass, and has an inner end formed with a screwthread 37 complementary to that of the bore 22, and immediately thereadjacent with a groove 231 for a seal 23 (FIG. 1). A stepped blind bore 32 opens at the threaded inner end and a transverse threaded bore 33 opens into this bore 32. This bore 33 receives the downstream nipple 41 of the respective S-pipe 40. The outer end of each fitting 3 is formed with a peripheral groove 34 and with a central axially open threaded hole 31. Finally, the fitting 3 is formed at its outer end with at least one flat 35 and at its inner end with at least one more such flat 32, both extending secantally of the axis A'. In use the threaded ends 37 are screwed into the fine threads of the bores 22 and small set screws 24 are engaged in the holes 28 with the flats 32 to lock them in place at the desired angular position.

Figure 8:
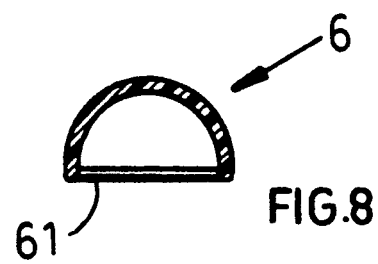
FIG. 8 is a section through a cover cap of the valve.

A synthetic-resin cover cap 6 shown in FIG. 8 has an inwardly projecting lip 61 that can be snapped into the groove 34 to cover and decorate the outer end of the fitting 3.

Figure 9:
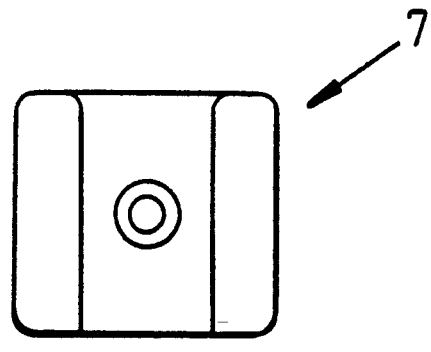
FIG. 9 is a front end view of a shower holder of the valve.
Figure 10:
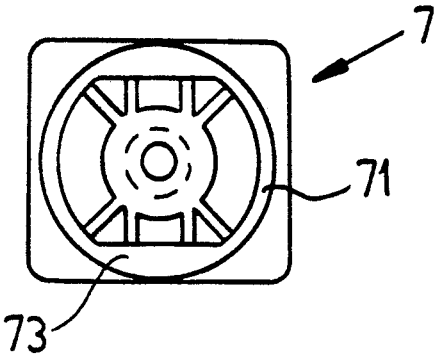
FIG. 10 is a rear end view of the shower holder.
Figure 11:
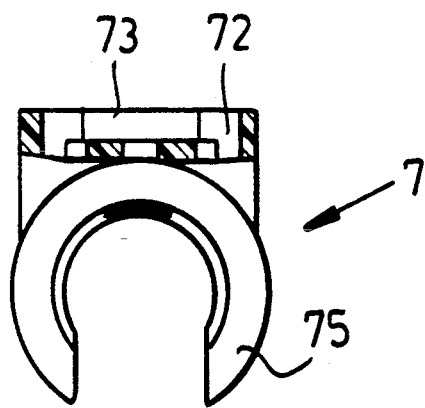
FIG. 11 is a partly sectional top view of the shower holder.

FIGS. 9 through 11 show the holder 7 that can also be fitted to the outer end of one of the fittings 3. This holder 7 has on its back side a cylindrical collar 71 shaped to fit around the outer end of the fitting 3 and formed internally with flats 73 that seat flat on the seats 35 thereof. On its front side the holder 7 has a pair of arms 75 adapted to hold a hand shower or spray. A screw 74 (FIG. 1) screwed centrally through the holder 7 engages in the bore 31 and secures it solidly in place.

The faucet 8 shown in FIGS. 1 and 2 is screwed onto the nipple 26 and is provided at its outer end with an aerator 81. This faucet can have a connection 82 for a hand shower and a diverter 83 for directing flow to this shower, which can hang in the holder 7.

The major elements of this invention—parts 2 and 3 —can be produced wholly by machining. This saves expense while still producing a very accurate product.

We claim:

1. A valve assembly adapted for connection to separate and spaced-apart hot- and cold-water supply pipes, the assembly comprising:

a generally cylindrical core centered on an upright core axis and formed with
   a pair of diametrally oppositely open threaded seats,
   a downwardly axially directed output nipple,
   an upwardly open flat valve seat,
   a pair of L-shaped input passages having adjacent output ends opening axially upward at the valve seat and input ends opening diametrally oppositely at the respective threaded seats, and
   an output passage having an output end opening axially downward in the output nipple and an input end opening axially upward at the valve seat;
respective substantially identical input tubes centered on a transverse axis generally perpendicular to the core axis and each formed with
   a threaded inner end screwed into the respective threaded seat of the core and an outer end, and
   respective L-shaped fitting passages each having an output end opening at the respective inner end into the input end of the respective input passages and an input end opening transversely of the transverse axis offset from the respective outer end;
respective means for locking the input tubes against rotation in the respective input ends;
respective supply connections threaded into the input ends of the fitting passages and adapted to be connected to the respective hot- and cold-water supply pipes;
means including a mixing valve fixed in the valve sweat and bearing downward on the valve seat over the output ends of the input passages and the input end of the output passage for feeding hot and cold water from the respective input passages to the output passage; and
a faucet threaded on the output nipple over the output end of the output passage.

2. The assembly defined in claim 1 wherein the means for locking are each constituted as a screw threaded in the core and bearing on the inner ends of the fittings, the inner ends being formed with flats engaged by the respective screws.

3. The assembly defined in claim 1 wherein the valve is a single-control valve.

4. The assembly defined in claim 1, further comprising
a decorative cap snap fitted on at least one of the outer ends.

5. The assembly defined in claim 4 wherein the one outer end is formed with a peripheral outwardly open groove into which the cap fits.

6. The assembly defined in claim 1, further comprising:
a holder for a shower or sprayer fixed on at least one of the outer ends and provided with a mounting screw threaded on the transverse axis through the holder into the respective fitting.

7. The assembly defined in claim 6 wherein the one outer end is formed with at least one flat with which the holder fits complementarily.

8. The assembly defined in claim 1 wherein the faucet is provided with a hand shower.

* * * * *